United States Patent [19]
Korshak et al.

[11] 3,988,303
[45] Oct. 26, 1976

[54] METHOD OF PREPARING POLYIMIDES

[76] Inventors: Vasily Vladimirovich Korshak, ulitsa Gubkina, 4, kv. 81; Svetlana Vasilievna Vinogradova, ulitsa Miklukho-Maklaya, 30, korpus 2, kv. 63; Yakov Semenovich Vygodsky, ulitsa Novatorov, 36, korpus 9, kv. 38; Zinaida Vasilievna Geraschenko, Profsojuznaya ulitsa, 102, korpus 6, kv. 25, all of Moscow, U.S.S.R.

[22] Filed: Dec. 23, 1974

[21] Appl. No.: 535,854

[52] U.S. Cl. .............................. 260/78 TF; 260/65; 260/47 R; 260/33.8 R; 260/31.2 R; 260/31.8 R
[51] Int. Cl.² ......................................... C08G 73/16
[58] Field of Search ............ 260/65, 78 TF, 31.2 R, 260/31.8 R, 33.8 R

[56] References Cited
UNITED STATES PATENTS

| | | |
|---|---|---|
| 3,526,610 | 9/1970 | Bower .................................. 260/65 |
| 3,634,325 | 1/1972 | Di Leone et al. ........... 260/78 TF X |
| 3,705,875 | 12/1972 | Browning ..................... 260/78 TF X |
| 3,732,189 | 5/1973 | Crivello et al. .............. 260/78 TT X |
| 3,865,841 | 2/1975 | Sicree et al. ..................... 260/78 TF |

*Primary Examiner*—Lucille M. Phynes
*Attorney, Agent, or Firm*—Haseltine, Lake & Waters

[57] ABSTRACT

A method of preparing polyimides by polycondensation of diamines and dianhydrides of tetracarboxylic acids in the presence of a catalyst, viz. a carboxylic acid such as acetic, benzoic, a tetracarboxylic acid taken in an amount of from 0.25 to 10, preferably from 0.8 to 2.5 COOH groups per one unit of a polyimide in a polar organic solvent medium which is inert with respect to the starting diamines and dianhydrides and immiscible with water at a temperature within the range of from 100° to 220° C.

7 Claims, No Drawings

METHOD OF PREPARING POLYIMIDES

The present invention relates to the production of highly heat-resistant polymers and, more specifically, to a method of preparing polyimides.

Polyimides represent polyheteroarylenes retaining high physico-mechanical and electric properties within a very broad range of temperatures (from −190° to +300° C). At present, they are extensively used in such fields of the modern industry as aviation and rocket engineering, mechanical engineering. They serve as a basis for the production of highly heat-resistant and thermostable films, varnish coatings, enamels, shaped articles, adhesives, foamed plastics, fibers and other articles.

Known in the art is a process for preparing polyimides by two-stage polycondensation of dianhydrides (or other derivatives) of tetracarboxylic acids and diamines. At the first stage, under low-temperaure (20°–50° C) polycondensation conditions, soluble polyamic acids are formed. Polyimides are prepared by a subsequent thermal (up to 325° C) or chemical (such as by a mixture of anhydrides of carboxylic acids and tertiary amines) cyclization. This process makes it possible, by molding, from a polyamic acid, films, fibers and the like, followed by a cyclization to form polyimides in the final articles, to manufacture articles from infusible and insoluble polyimides. Furthermore, this two-stage process features some substantial difficulties due to elimination of water or other low-molecular weight product of cyclization contributing to lack of integrity, increased porosity of an article and frequently causing degradation of a polyamic acid.

To prepare thermoplastic and soluble polyimides it is more advantageous to use a one-stage method which makes it possible to perform cyclization prior to the manufacture of articles from the polymer, whereby a better quality of articles is ensured due to reduced amounts of pores, cracks and other defects. This one-stage method makes it possible to prepare infusible and insoluble polyimides which are processed into articles by sintering, hot compression molding, and the like. According to this method, the starting diamine and tetracarboxylic acid dianhydride are heated in a polar organic solvent medium which is inert with respect to the starting dianhydrides and diamines and immiscible with water (for example nitrobenzene) at a temperature ranging from 180° to 210° C. Therewith, in contrast to the two-stage polycondensation, wherein the molecular weight of the final polyimide is restricted by the molecular weight of the polyamic acid, in this one-stage method a growth of the molecular weight, i.e. proper reaction of the polymer formation, proceeds at the above-mentioned elevated temperatures simultaneously with cyclization. The molecular weight of polyimides prepared by this method is considerably higher (by 1.5 to 2 times) than the molecular weight of similar polymers prepared in the two-stage process with the thermal cyclization, while the degree of cyclization of polyimides prepared by the one-stage method is about 100%.

This one-stage method of preparing polyimides features a disadvantage residing in an insufficient reaction rate necessitating the use of elevated temperatures for a relatively long time period, i.e. of the order of from 7 to 14 hours. Moreover, using less-reactive dianhydrides, e.g. 1,4,5,8-naphthalene-tetracarboxylic acid dianhydride, in the synthesis of polyimides, it is practically impossible to obtain the polymer. An essential limitation of the one-stage method resides in the fact that this method cannot result in the production of linear thermoplastic polyimides of 3,3',4,4'-benzophenone-tetracarboxylic acid, since simultaneously with the formation of these polymers there occurs cross-linking thereof to infusible and insoluble cross-linked polyimides.

It is an object of the present invention to substantially increase the reaction rate, thereby decreasing the process temperature and duration and widening the limits of its application, while retaining such features of the one-stage process as its simplicity as well as a high degree of cyclization of the polyimides and a high molecular weight thereof.

This object is accomplished by the method of preparing polyimides which, according to the present invention, comprises polycondensation of diamines and dianhydrides of tetracarboxylic acids in the presence of a catalyst, viz., a carboxylic acid taken in an amount of 0.25 to 10 COOH groups per one unit of a polyimide in a polar organic solvent medium which is inert with respect to the starting diamines and dianhydrides and immiscible with water at a temperature within the range of from 100° 220° C.

It is advisable, in accordance with the present invention, to use, as the catalyst — carboxylic acid, an acid corresponding to the formula $R(COOH)_n$, where R represents an aliphatic, aromatic, heterocyclic radical; $n = 1$ to 4.

It is most advantageous, from the technological considerations, to use acetic or benzoic acid as the catalyst. It is also advantageous to employ a tetracarboxylic acid which in this case plays the role not only of a catalyst but also of a reagent participating in the polycondensation reaction along with a dianhydride. This is especially important in cases where a tetracarboxylic acid is a monomer for the production of a dianhydride.

The catalyst, viz. a carboxylic acid should be preferably employed, in accordance with the present invention, in an amount of from 0.8 to 2.5 COOH groups per one unit of polyimide.

As the organic solvent it is advisable to use, according to the present invention, nitroaromatic hydrocarbons such as nitrobenzene, chlorinated aliphatic or aromatic hydrocarbons such as symmetrical tetrachloroethane, o-dichlorobenzene, alpha-chloronaphthalene, a mixture of tetra- and penta-chlorodiphenyl (sovol), trichlorobenzene, aromatic nitriles such as benzonitrile.

Polycondensation of diamines with 3,3',4,4'-benzophenone-tetracarboxylic acid dianhydride should be performed, in accordance with the present invention, within the temperature range of from 120° to 140° C; using 1,4,5,8-naphthalene-tetracarboxylic acid — within the range of from 190° to 220° C.

The method of the present invention makes it possible to effect polycondensation of diamines with 3,3',4-,4'-benzophenone-tetracarboxylic acid dianhydride at a temperature within the range of from 120° to 140° C and with 1,4,5,8-naphthalene-tetracarboxylic acid dianhydride — within the range of from 190° to 220° C with the formation of high-molecular weight linear polyimides which cannot be produced by the above-discussed one-stage non-catalytic method.

An advantage of the method according to the present invention resides in a substantial increase in polycondensation rate, whereby high-molecular weight polyimides can be prepared at a lower temperature as compared to that of the prior art method, i.e. down to 100° C or to reduce the process duration to 1 hour. This enables a wider range of solvents for the reaction. In addition to nitrobenzene and benzonitrile employed in said one-stage non-catalytic method, use may be made, in the present invention, of sym-tetrachloroethane, o-dichlorobenzene, alpha-chloronaphthalene and other solvents with a boiling point of 100° C and above.

Only using a catalytic process it has become possible to prepare linear, fusible and soluble thermosetting polyimides such as those based on 3,3',4,4'-benzophenone-tetracarboxylic acid dianhydride which, in the course of said one-stage non-catalytic process are obtained in a cross-linked insoluble condition. In polyimides based on 3,3',4,4'-benzophenone-tetracarboxylic acid dianhydride and prepared by way of a two-stage polycondensation with chemical cyclization of polyamidoacids by means of acid anhydrides and tertiary amines such as by a mixture of acetic acid anhydride and pyridine, at the ends of chains, instead of amino groups, there are acetamide groups, whereby further curing of such polyimides is substantially hindered. On the contrary, polyimides based on 3,3',4,4'-benzophenone-tetracarboxylic acid dianhydride and prepared by way of a one-stage polycondensation in the presence of carboxylic acids can be transformed into a insoluble and infusible form upon heating to and temperature above 200° C, and preferably at 300° C.

Another advantage of the method according to the present invention resides in the fact that an increased rate of polycondensation of diamines and tetracarboxylic acid dianhydrides makes it possible to prepare high-molecular filmforming polyimides of the following structure:

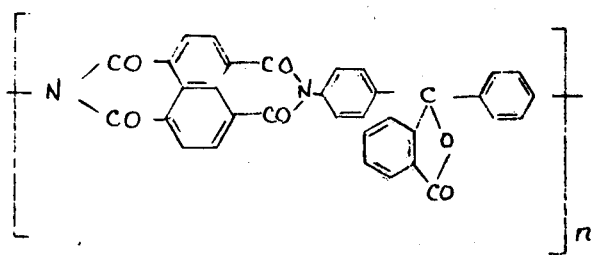

on the basis of less-reactive dianhydrides with 6-membered rings such as 1,4,5,8-naphthalene-tetracarboxylic acid dianhydride, which are characterized by an inherent viscosity of $\eta_{inh}$ of 1–2 dl/g. Such polyimides are substantially superior, as to their heat-resistance and hydrolytic resistance, over polyimides with 5-membered imide rings such as polypyromellitimides. They, however, cannot be prepared by said one-stage non-catalytic method.

The catalytic method is applicable also to the production of soluble and insoluble, fusible and infusible polyimides which, in some cases, directly after the reaction may be used for the manufacture of various articles (films, fibers, coatings) without any additional chemical or thermal treatment which is usually necessary to close the ring.

The synthesis of a polyimide is effected by heating equimolecular amounts of a tetracarboxylic acid dianhydride and a diamine with a catalyst, viz. carboxylic acid such as benzoic acid in an amount of from 0.8 to 2.5 COOH groups per one mole of a dianhydride or diamine in a polar organic solvent medium which is inert with respect to the starting diamines and dianhydrides and immiscible with water such as nitrobenzene, in an atmosphere of a dry inert gas such as nitrogen or argon to a predetermined temperature of the order of from 100° to 180° C and maintained at this temperature during a required time period. In this procedure of preparing soluble polyimides a reaction mass which in the beginning of the reaction comprises a thick slurry of the starting and intermediate compounds, at the reaction temperature is transformed into a homogeneous solution which, as the polycondensation proceeds further, becomes more viscous. As a rule, such polyimides remain in solution after completion of the reaction and cooling of the reaction mass. The polyimide is recovered by way of precipitating the reaction solution into a non-solvent (acetone, methanol, ethanol), filtering and washing with one of said non-solvents for the polyimide and drying in vacuum at a temperature ranging from 80° to 100° C.

Intrinsic viscosity of a solution of 0.05 g of the polyimide in 10 ml of an organic solvent (dimethylformamide or sym-tetrachloroethane) is determined at 25° C and calculated from the formula:

$$\eta_{inh} \frac{\ln \eta_{rel}}{C}$$

wherein
$\eta_{rel}$ is a relative viscosity;
C — concentration of the polyimide solution, g/dl,
ln — natural logarithm.

Insoluble polyimides which remain in the precipitate during the entire polycondensation time, on completion of the reaction are filtered off, washed with acetone, methanol or other organic solvents and dried in vacuum at a temperature of from 80° to 100° C. An inherent viscosity of a solution of 0.05 g of the polyimide in 10.0 ml of a concentrated sulfuric acid is determined at 25° C and calculated on the basis of the above-given formula.

Structure of the resulting polyimides is proven by the data of IR-spectra (by the presence of two absorption bands for >CO groups of the imide ring at 1,720–1,730 and 1,780 cm$^{-1}$ (5-membered ring) and at 1,680 and 1,720 cm$^{-1}$ (6-membered ring) and by the absence of absorption bands characteristic of >CO groups of an amide (1,680 cm$^{-1}$) and OH groups.

Polyimides prepared by the catalytic method feature a weight-average molecular weight of the order of $50.10^3$ to $200.10^3$, inherent viscosity $\eta_{inh} = 0.7$ to 2.0 dl/g; their glass transition temperature is within the range of from 320° to 520° C; initial weight loss temperature thereof, as from the dynamic thermogravimetric data, in the air at the temperature growth rate of 4.5°/min is within the range of from 400° to 500° C. An essential advantage of the polyimides prepared by the one-stage catalytic method resides in a high cyclization degree nearing 100% (99% and over).

The resulting polyimides possess film- and fiber-forming properties. Films of soluble polyimides cast from solutions in chlorinated and fluorinated solvents onto a glass surface are characterized by a tensile strength ($\sigma$) of the order of from 1,000 to 1,500 kgf/cm$^2$ and elongation ($\epsilon$) of about 10–50%.

For a better understanding of the present invention the following specific Examples illustrating the method of preparing polyimides are given hereinbelow.

EXAMPLE 1

Into a 100 ml four-necked flask provided with a stirrer, inlet and outlet tubes for the supply and discharge of an inert gas (argon, nitrogen) 3.48 g of 9,9-bis-(4'-aminophenyl) fluorene (aniline-fluorene), 3.10 g of 3,3',4,4'-diphenyloxide tetracarboxylic acid dianhydride, 2.73 g of benzoic acid (molar ratio of the components is 1.0:1.0:2.5) and 30 ml of nitrobenzene are charged. The reaction mixture is heated to 120° under stirring and passing an inert gas therethrough, and the reaction is conducted at this temperature for one hour. The resulting viscous solution of polyimide is cooled, on completion of the reaction, diluted with chloroform and poured, with stirring, into a great excess of acetone. The resulting fibrous polymer is filtered off, repeatedly washed with acetone and ethanol to remove the solvent and benzoic acid, and dried in vacuum at a temperature of from 80° to 90° C.

The polymer yield is quantitative. $\eta_{inh}$ of the polyimide solution (0.05 g of the polymer in 10 ml of dimethylformamide (DMFA) at 25° C is 0.92 dl/g which corresponds to $\overline{M}_w = 230,000$. The polyimide structure is proven by the data of IR-spectroscopy.

EXAMPLE 2

Under the conditions of Example 1 a polyimide is produced from 3,3',4,4'-benzophenone tetracarboxylic acid dianhydride and 3,3-bis-(4'-aminophenyl) phthalide in the presence of acetic acid (2 moles per one mole of the monomers). The reaction is performed at a temperature ranging from 120° to 140° C to give a viscous polymer solution which is treated as in Example 1 to recover the polymer. The polymer yield is quantitative; $\eta_{inh}$ of the polymer solution (0.05 g in 10 ml of DMFA) at 25° C is 0.88 dl/g. The polymer is soluble in DMFA, chloroform, methylene chloride and the like.

EXAMPLE 3

In a manner similar to that described in Example 1 the polypyromellitimide of 3,3-bis-(4'-aminophenyl) phthalide is prepared in the presence of benzoic acid (2 moles per 1 mole of the starting compounds). The polymerization temperature is 140° C, duration — 1.5 hours. The polymer is recovered by adding a solution of the polymer diluted with DMFA to ethanol taken in a great excess. The precipitated polymer is filtered off, washed with acetone and alcohol and dried in vacuum at 80° C. The polymer yield is quantitative. $\overline{M}_w$ of the polymer is 140,000 (as measured by the sedimentation method).

EXAMPLE 4

In a manner similar to that described in Example 1 a polyimide is prepared from 3,4,3',4'-diphenyl-2,2'-propanetetracarboxylic acid dianhydride and 4,4'-diamino diphenyloxide in nitrobenzene medium in the presence of acetic acid (2 moles per 1 mole of the starting compounds). The reaction is performed at 115° C for 1 hour to give a viscous polymer solution, and the polymer is recovered in a manner similar to that of Example 1. The polymer yield is quantitative. $\eta_{inh}$ of the polymer solution in DMFA at 25° C is 0.60 dl/g (0.05 g of the polymer in 10 ml of the solvent). The polymer is soluble in dimethylformamide, methylene chloride, chloroform, tetrachloroethane, dioxane and the like.

EXAMPLE 5

In a manner similar to that described in Example 1, a polyimide is prepared from 3,3',4,4'-benzophenone tetracarboxylic acid dianhydride and aniline-fluorene in symtetrachloroethane (concentration of the monomers is 0.3 mol/l) in the presence of acetic acid (2 moles per 1 mole of the monomers). The reaction is performed at 100° C for 1 hour to give a viscous polyimide solution. The polymer is recovered by adding the reaction solution diluted with chloroform to methanol in excess, followed by filtration of the precipitated polymer and washing thereof with acetone. A film of the polyimide is formed by casting from the reaction solution onto a glass surface at a temperature of from 60° to 80° C which film is then dried in vacuum at a temperature within the range of from 100° to 120° C. The polymer yield is quantitative. $\eta_{inh}$ of a solution of the polyimide in DMFA is 0.45 dl/g.

EXAMPLE 6

Into a 100 ml four-necked flask provided with a stirrer, an inlet tube for the supply of an inert gas and an outlet pipe for the discharge of said inert gas 0.654 g of pyromellitic anhydride, 0.60 g of 4,4'-diaminodiphenyloxide, 0.45 ml of acetic acid and 10.0 ml of nitrobenzene. The reaction mixture is heated to 120° C with stirring and passing an inert gas and maintained at this temperature for 1 hour. On completion of the reaction and cooling the reaction mixture, the precipitated polymer is filtered off, repeatedly washed with acetone and ethanol and dried in vacuum at 120° C $\eta_{inh}$ in sulfuric acid is 0.67 dl/g. (0.05 g of the polymer in 10 ml of the solvent).

EXAMPLE 7

In a manner similar to that described in Example 1, a polymer is prepared from 3,3',4,4'-diphenyloxide tetracarboxylic acid dianhydride and 9,9-bis-(4'-aminophenyl)fluorene in the presence of o-chlorobenzoic acid (2.0 moles per 1 mole of the monomers). The reaction is performed for 1 hour at 180° C to give a viscous polymer solution which is then treated to recover the polymer in a manner similar to that described in Example 1. The polymer yield is quantitative, $\eta_{inh}$ of the polymer solution (0.05 g of the polymer in 10 ml of DMFA) at 25° C is 0.83 dl/g.

EXAMPLE 8

In a manner similar to that described in Example 1, a polyimide is prepared from 3,3',4,4'-diphenyloxide tetracarboxylic acid dianhydride and 9,9-bis-(4'-aminophenyl)fluorene using, as a catalyst, p-ethylbenzoic acid in the amount of 2.5 moles per 1 mole of the starting compounds. The polycyclization temperature is 180° C, duration — 1 hour. The polyimide yield is quantitative, $\eta_{inh}$ of the polyimide solution in DMFA (0.05 g of the polymer in 10 ml of the solvent) is 0.87 dl/g.

EXAMPLE 9

In a manner similar to that described in Example 1 a polyimide is prepared from 3,3',4,4'-diphenyloxide tetracarboxylic acid dianhydride and 9,9-bis-(4'-aminophenyl)fluorene in the presence of a catalyst, i.e. m-fluorobenzoic acid in the amount of 2.5 moles per 1 mole of the monomers. The polycyclization temperature is 180° C, duration — 1 hour. The polyimide yield is quantitative, $\eta_{inh}$ of the polyimide solution is DMFA at 25° C is 0.88 dl/g.

EXAMPLE 10

In a manner similar to that described in Example 1 a polyimide is prepared from 3,3',4,4'-diphenyloxide tetracarboxylic acid dianhydride and aniline-fluorene in the presence of propionic acid in the amount of 2.5 moles per 1 mole of the monomers. The reaction is performed at 120° C for 7 hours to give a viscous polymer solution; the polymer is further recovered in a manner similar to that of Example 1. The polymer yield is quantitative, $\eta_{inh}$ of the polymer solution in DMFA is 0.78 dl/g.

EXAMPLE 11

In a manner similar to that described in Example 1, a polyimide is prepared from 3,3',4,4'-diphenyloxide tetracarboxylic acid dianhydride and aniline-fluorene in the presence of a catalyst, i.e. n-butyric acid in the amount of 2.5 moles per 1 mole of the monomers. The reaction is performed for 8 hours at 110° C to give a viscous polyimide solution; the polymer is recovered by the procedure of Example 1. The polymer yield is quantitative, $\eta_{inh}$ of the polymer solution in DMFA is 0.80 dl/g.

EXAMPLE 12

In a manner similar to that described in Example 1, a polyimide is prepared from 3,3',4,4'-diphenyloxide tetracarboxylic acid dianhydride and aniline-fluorene in the presence of a catalyst, i.e. picolinic acid in the amount of 2.0 moles per 1 mole of the monomers. The polycyclization temperature is 180° C, duration of the reaction is 1 hour. The polymer yield is quantitative, $\eta_{inh}$ of the polyimide solution in DMFA is 0.94 dl/g.

EXAMPLES 13–18

In a manner similar to that described in Example 1, a polyimide is prepared from 3,3',4,4'-diphenyloxide tetracarboxylic acid dianhydride and aniline-fluorene in the presence of different amounts of benzoic acid. The results of the experiments are shown in Table 1 hereinbelow. Example 1 is given for the comparison purposes.

Table 1

| Example No. | Amount of $C_6H_5COOH$ (in mol. per one mole of the monomers) | Reaction conditions | Molecular weight $M_{w}$ |
|---|---|---|---|
| 13 | 0 | Reaction | 55,000 |
| 14 | 0.25 | temperature is | 112,000 |
| 15 | 0.50 | 180° C, duration — | 117,000 |
| 16 | 1.00 | one hour. Monomer | 145,000 |
| 17 | 2.00 | concentration is | 160,000 |
| 18 | 10.00 | 0.3 mol/l, solvent — | 150,000 |
| 1 | 2.50 | nitrobenzene. | 276,000 |

EXAMPLES 19–22

A polyimide is prepared from 3,3',4,4'-diphenyloxide tetracarboxylic acid dianhydride and aniline-fluorene in the presence of benzoic acid as a catalyst in the amount of 2.5 mole per 1 mole of the monomers in various solvents. The data are shown in Table 2 hereinbelow.

Table 2

| Example No. | Solvent | Reaction conditions | | Molecular weight $M \cdot 10^{-3}$ | |
|---|---|---|---|---|---|
| | | Temperature, °C | Duration, hrs | with $C_6H_5COOH$ | without |
| 19 | Nitrobenzene | 120 | 5 | 170 | 83 |
| 20 | Benzonitrile | 180 | 1 | 170 | 105 |
| 21 | o-dichlorobenzene | 180 | 1 | 220 | 125 |
| 22 | sym-tetrachloroethane | 120 | 9 | 204 | 135 |

EXAMPLE 23

Into a 100 ml four-neck flask provided with a stirrer and pipes for the supply and discharge of a dry inert gas (argon, nitrogen) 2.144 g of 1,4,5,8-naphthalene-tetracarboxylic acid dianhydride 2.528 g of 3,3-bis-(4'-aminophenyl)phthalide, 0.814 g of benzoic acid (0.8 mole per 1 mole of the monomers) and 30 ml of nitrobenzene are charged. The reaction mixture is heated with stirring in argon medium to a temperature of about 160° C and maintained at this temperature for 1 hour till a transparent solution is formed. Thereafter, the temperature is elevated to 190° C and the reaction is continued with stirring for 7 hours. At the end of the reaction a viscous polymer solution is obtained which is cooled to 180° C and diluted to a 3% concentration with hot nitrobenzene. The hot diluted solution of the polyimide is poured, under stirring, into a great excess of acetone. The precipitated yellow fibrous polymer is filtered off, repeatedly washed with acetone and dried in a vacuum at the temperature of 80° C. The polyimide yield is quantitative. $\eta_{inh}$ of the polymer is 1.22 dl/g (solution of 0.05 g of the polymer in 10.0 ml of sym-tetrachloroethane, 25° C). The polymer is soluble in tetrachloroethane, N-methylpyrrolidone, hexafluoroisopropanol, monohydrate of 1,3-dichloro-1,1,3,3-tetrafluoroacetone; partially soluble in m-cresol, soluble upon heating (120° C) in dimethyl sulfoxide but insoluble in dimethylformamide, dimethylacetamide, cyclohexanone chloroform and other solvents.

A similar polyimide prepared without a catalyst for 15 hours at a temperature within the range of from 200° to 210° C has a $\eta_{inh} = 0.16$ dl/g (sym-tetrachloroethane, 25° C).

EXAMPLE 24

Under the conditions of Example 23 a mixed polyimide is prepared from 3,3-bis-(4'-aminophenyl)-phthalide, 4,4'-diaminodiphenyloxide and 1,4,5,8-naphthalene-tetracarboxylic acid dianhydride (molar ratio is 0.5:0.5:1.0) in the presence of a catalyst, viz. benzoic acid. The polymer yield is quantitative. The polyimide is soluble in hexafluoroisopropanol; from this solution it forms a durable transparent film; this polymer is insoluble in tetrachloroethane, monohydrate of 1,3-dichlorotetrafluoroacetone, and partially soluble in m-cresol and N-methylpyrrolidone.

EXAMPLE 25

Under the conditions of Example 23 a mixed polyimide is prepared from 3,3-bis-(4'-aminophenyl)-phthalide, anilinefluorene, and 1,4,5,8-naphthalene tetracarboxylic acid dianhydride (molar ratio of the components is 0.5:0.5:1.0) in the presence of benzoic acid as a catalyst in the amount of 0.8 mole per 1 mole of the monomers. The reaction temperature is 220° C; duration — 7 hours. The polyimide yield is quantitative, $\eta_{inh}$ = 0.90 dl/g (sym. tetrachloroethane, 25° C).

EXAMPLES 26–32

Polyimides are prepared in a manner similar to that described in Example 1 from pyromellitic dianhydride and 3,3-(4-aminophenyl)-phthalide in nitrobenzene in the presence of different carboxylic acids. The data are shown in Table 3.

Table 3

| Example No. | Carboxylic acid | | Reaction conditions | | | |
|---|---|---|---|---|---|---|
| | Type | Number of COOH groups in a molecule | Concentration, mol./mole of the starting products | temperature, °c | Duration, hours | $\eta_{inh}$ of polyimide in DMFA dl/g |
| 26 | 3,5-dinitrobenzoic acid | 1 | 2.5 | 180 | 1 | 0.94 |
| 27 | Stearic acid | 1 | 2.5 | 180 | 1 | 0.87 |
| 28 | Adipic acid | 2 | 2.0 | 180 | 1 | 1.02 |
| 29 | Isophthalic acid | 2 | 2.0 | 180 | 1 | 1.08 |
| 30 | Fumaric acid | 2 | 2.0 | 160 | 3 | 0.78 |
| 31 | Trimellitic acid | 3 | 2.0 | 160 | 1 | 0.85 |
| 32 | Pyromellitic acid | 4 | a* | 180 | 5 | 0.75 | a*Pyromellitic acid (PMA) is employed instead of a portion of pyromellitic dianhydride (PMDA), wherefore the molar ratio 3,3-bis-(4'-aminophenyl)-phthalide: pyromellitic acid: pyromellitic dianhydride is 1:0.2:0.8 respectively.

What we claim is:

1. A method of preparing a film- and fiber-forming polyimide comprising the polycondensation of a diamine and a dianhydride of a tetracarboxylic acid in the presence of a catalyst, consisting of a carboxylic acid employed in an amount of from 0.25 to 10 COOH groups per one unit of the polyimide, in a polar organic solvent medium inert with respect to the starting diamine and dianhydride and immiscible with water, at a temperature within the range of from 100° to 220° C.

2. The method of claim 1, wherein the carboxylic acid has the formula $R(COOH)_n$, where R is an aliphatic, aromatic or heterocyclic radical; and $n = 1$ to 4.

3. The method of claim 1, wherein the carboxylic acid is selected from the group consisting of acetic acid and benzoic acid.

4. The method of claim 1, wherein the carboxylic acid is employed in an amount of from 0.8 to 2.5 COOH groups per one unit of the polyimide.

5. The method of claim 1, wherein the organic solvent is selected from the group consisting of nitroaromatic hydrocarbons, chlorinated aromatic hydrocarbons, chlorinated aliphatic hydrocarbons and aromatic nitriles.

6. The method of claim 1, wherein the dianhydride is 3,3',4,4'-benzophenone tetracarboxylic acid dianhydride and the polycondensation is performed at a temperature of from 120° to 140° C.

7. The method of claim 1, wherein the dianhydride is 1,4,5,8-naphthalene tetracarboxylic acid dianhydride and the polycondensation is performed at a temperature of from 190° to 220° C.

* * * * *